US009954400B2

(12) United States Patent
Akram et al.

(10) Patent No.: US 9,954,400 B2
(45) Date of Patent: Apr. 24, 2018

(54) WIRELESS POWER RECEIVER WITH PROGRAMMABLE POWER PATH

(71) Applicant: MediaTek Singapore Pte. Ltd., Singapore (SG)

(72) Inventors: Hasnain Akram, Woburn, MA (US); Yung-Chih Yen, Tainan (TW); Patrick Stanley Riehl, Cambridge, MA (US); Anand Satyamoorthy, Somerville, MA (US)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 15/037,051

(22) PCT Filed: Jan. 8, 2015

(86) PCT No.: PCT/US2015/010540
§ 371 (c)(1),
(2) Date: May 17, 2016

(87) PCT Pub. No.: WO2015/105925
PCT Pub. Date: Jul. 16, 2015

(65) Prior Publication Data
US 2016/0299521 A1 Oct. 13, 2016

Related U.S. Application Data

(60) Provisional application No. 61/924,762, filed on Jan. 8, 2014.

(51) Int. Cl.
*H02M 3/156* (2006.01)
*H02J 50/12* (2016.01)
(Continued)

(52) U.S. Cl.
CPC .............. *H02J 50/12* (2016.02); *G05F 1/575* (2013.01); *H01F 38/14* (2013.01); *H02J 5/005* (2013.01);
(Continued)

(58) Field of Classification Search
None
See application file for complete search history.

(56) References Cited

U.S. PATENT DOCUMENTS 5,493,189 A * 2/1996 Ling ..................... H02P 6/14
318/400.23
6,005,377 A 12/1999 Chen
(Continued)

FOREIGN PATENT DOCUMENTS

CN 101939899 A 1/2011
CN 102170240 A 8/2011
(Continued)

OTHER PUBLICATIONS

"International Search Report" dated Apr. 28, 2015 for International application No. PCT/US15/10540, International filing date:Jan. 8, 2015.
(Continued)

*Primary Examiner* — Jeffrey Gblende
(74) *Attorney, Agent, or Firm* — Wolf, Greenfield & Sacks, P.C.

(57) ABSTRACT

A synchronous rectifier using only n-channel devices in which the low-side switches are effectively cross-coupled using low-side comparators and the high-side switches perform an accurate zero-voltage-switching (ZVS) comparison. The charging path of each bootstrap domain is completed through the low-side switches, which are each always on for every half-cycle independent of loading. This scheme gives rectifier efficiency gain because a) each bootstrap domain
(Continued)

receives maximum charging time, and b) the charging occurs through a switch rather than a diode. Both these factors ensure the bootstrap domain is fully charged, thereby reducing conduction losses through the rectifier switches. Furthermore, settings may be adjusted by software to optimize the resistive and capacitive losses of the rectifier. Using data for die temperature and operating frequency, software can create a feedback loop, dynamically adjusting rectifier settings in order to achieve the best possible efficiency.

18 Claims, 11 Drawing Sheets

(51) Int. Cl.
      *H02J 5/00*     (2016.01)
      *H02J 7/02*     (2016.01)
      *H01F 38/14*    (2006.01)
      *G05F 1/575*    (2006.01)
      *H02M 3/07*     (2006.01)
      *H02M 7/217*   (2006.01)
      *H04B 5/00*     (2006.01)
      *H02M 1/00*     (2006.01)
      *H02M 7/219*   (2006.01)
      *G05F 1/56*     (2006.01)

(52) U.S. Cl.
    CPC ............... *H02J 7/025* (2013.01); *H02M 3/07* (2013.01); *H02M 3/156* (2013.01); *H02M 7/217* (2013.01); *H04B 5/0037* (2013.01); *G05F 1/56* (2013.01); *H02M 2001/0045* (2013.01); *H02M 2007/2195* (2013.01); *Y02B 70/1408* (2013.01); *Y02B 70/1425* (2013.01); *Y02B 70/1441* (2013.01)

(56) References Cited

U.S. PATENT DOCUMENTS

| | | | |
|---|---|---|---|
| 6,064,174 A * | 5/2000 | Sziebert | H02P 25/034 318/254.2 |
| 6,150,798 A | 11/2000 | Ferry | |
| 2006/0255779 A1 | 11/2006 | Huang | |
| 2008/0055942 A1 | 3/2008 | Tao | |
| 2008/0259665 A1 * | 10/2008 | Brederlow | H02M 7/217 363/127 |
| 2009/0016083 A1 | 1/2009 | Soldano | |
| 2010/0073039 A1 * | 3/2010 | Kanai | H02M 7/5387 327/110 |
| 2011/0115510 A1 * | 5/2011 | Colvin | G01R 31/00 324/750.03 |
| 2011/0175582 A1 | 7/2011 | Latham | |
| 2011/0193612 A1 | 8/2011 | Kuebrich | |
| 2012/0116483 A1 * | 5/2012 | Yonezawa | A61N 1/36 607/74 |
| 2013/0043932 A1 | 2/2013 | Khlat | |
| 2013/0176758 A1 | 7/2013 | Tseng et al. | |
| 2013/0271069 A1 | 10/2013 | Partovi | |
| 2013/0271099 A1 | 10/2013 | Li | |
| 2014/0104909 A1 * | 4/2014 | Kwong | H02M 7/219 363/127 |
| 2015/0035507 A1 | 2/2015 | Cowley et al. | |
| 2015/0054451 A1 | 2/2015 | Rokusek et al. | |
| 2015/0364928 A1 | 12/2015 | Yen et al. | |
| 2016/0268834 A1 | 9/2016 | Satyamoorthy et al. | |

FOREIGN PATENT DOCUMENTS

| | | |
|---|---|---|
| CN | 102801323 A | 11/2012 |
| CN | 103378730 A | 10/2013 |
| EP | 0891038 A1 | 1/1999 |
| EP | 1093212 A1 | 4/2001 |
| JP | 2003-309978 A | 10/2003 |
| WO | WO 2011/150339 A2 | 12/2011 |
| WO | 2013095514 A1 | 6/2013 |
| WO | WO 2015/105924 A1 | 7/2015 |

OTHER PUBLICATIONS

"International Search Report" dated Apr. 28, 2015 for International application No. PCT/US15/10539, International filing date:Jan. 8, 2015.

International Preliminary Report on Patentability for Application No. PCT/US2015/010539 dated Jul. 21, 2016.

International Preliminary Report on Patentability for Application No. PCT/US2015/010540 dated Jul. 21, 2016.

Extended European Search Report for Application No. EP 16189208.8 dated Feb. 8, 2017.

Extended European Search Report for Application No. EP 15735245.1 dated Mar. 3, 2017.

\* cited by examiner

WIRELESS POWER RECIEVER INTEGRATED CIRCUIT
WITH PROGRAMMABLE POWER PATH MODE

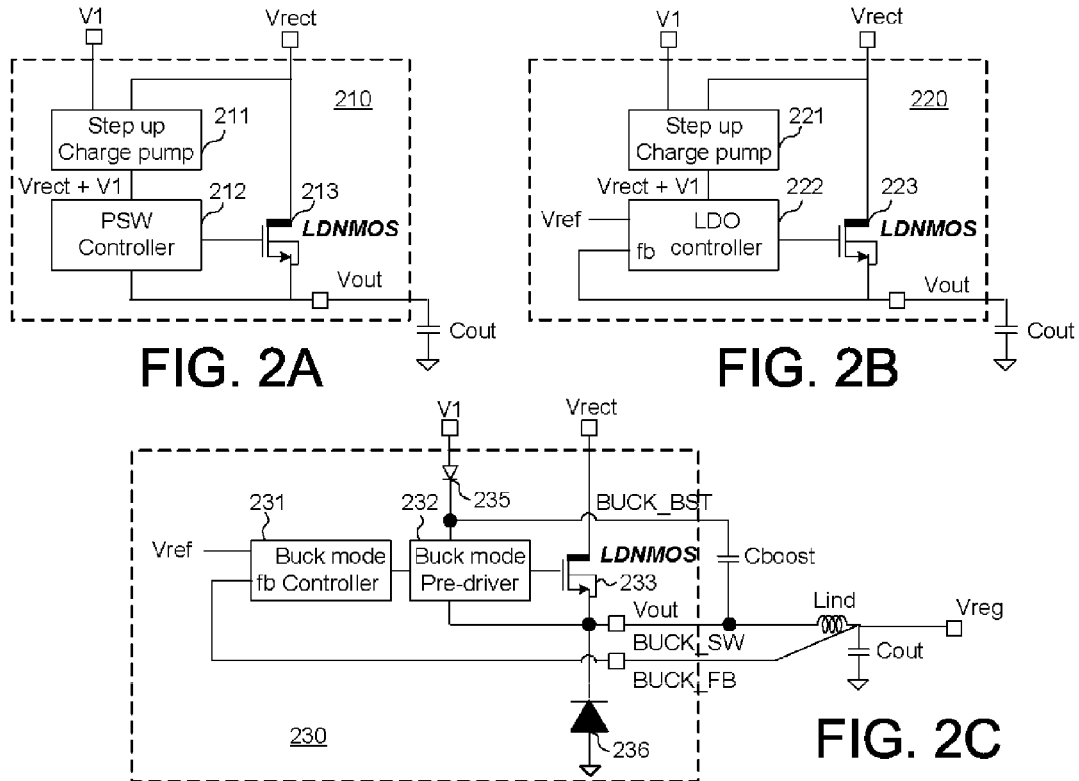

FIG. 2A  FIG. 2B  FIG. 2C

| Configuration | PSW mode | LDO mode | SMPS mode |
|---|---|---|---|
| Output voltage regulation | Unregulated | Regulated | Regulated |
| Output inductor | Optional (no benefit) | Not used | Required |
| Efficiency at low VRECT | Very high | High | Design-dependent |
| Efficiency at high VRECT | Very high | Low | Design-dependent |
| Suitable for single-receiver charging system | Yes | Yes | Yes |
| Suitable for multiple-receiver charging system | Yes | No (poor efficiency) | Yes |
| Suitable for retrofit to wired charging system | No (output not regulated) | Yes | Yes |

FIG. 3

FIRST EMBODIMENT

SECOND EMBODIMENT

LOOPBACK MODE

WIRELESS POWER RECEIVER WITH PROGRAMMABLE POWER PATH

CROSS REFERENCE TO RELATED APPLICATIONS

This application claims priority under 35 U.S.C. § 119 from U.S. Provisional Application No. 61/924,762, entitled "Wireless Power Receiver with Programmable Power Path Mode," filed on Jan. 8, 2014, the subject matter of which is incorporated herein by reference.

TECHNICAL FIELD

The present disclosure relates generally to wireless power, and more particularly to wireless power receiver with programmable power path mode.

BACKGROUND

Wireless power (WP) transfer systems use the mutual inductance between two magnetic coils to transfer power through magnetic induction. At the receiver side, usually a receiver coil is connected to a bridge rectifier following by a regulator. The bridge rectifier converts the AC power signal to DC power supply and the regulator regulates the DC power supply to a suitable voltage level for the following circuit such as a battery charger. Wireless power systems are commonly classified as either "inductive" or "resonant" type. In inductive type wireless powering system, a wireless transmitter and receiver operate like a tightly coupling transformer to deliver energy. The restriction in inductive type makes it only suitable for single receiver charging at the same time. On the other hand, in resonant type wireless powering system, power delivery is through a loosely coupled coil pairs and by utilizing electrical resonance to enhance the system efficiency. Receiver numbers can be increased and charged in the same field.

At the wireless power receiver side, voltage regulation is applied to step-down the rectifier voltage to a suitable voltage for the following charger circuit. In inductive single receiver wireless power system, this regulation can be a linear Low dropout regulator (LDO). The efficiency of a LDO is defined by its output-to-input ratio. In a single receiver wireless system, the LDO input voltage (the rectifier voltage) can be controlled to very close to its output voltage and get higher power efficiency. Power control is by sending power control message from the receiver to the transmitter through in band or out-of-band communication.

In resonant mode wireless power system, multiple receivers make it impossible to control all the rectifier voltages close to the target charging voltage because each receiver have different coil coupling factors. The rectifier voltage thus can be much higher than the regulator output that make the power transfer very inefficient through an LDO. Therefore, a switching mode regulator (SMPS) is applied for better efficiency when the voltage step down ratio is large.

Recently, fast charging is more and more important for smart phone and tablet applications. Reducing the charging time with larger charging current (e.g., >1 A) is adopted by more and more products that already launched in the consumer market. In fast charging, the charger circuit can charge at a higher input voltage (e.g., ~20V) rather than a regulated voltage (e.g., ~5V). As a result, the wireless power receiver can directly connect the rectifier output to the fast charging charger through a power switch (PSW). The power switch is used to control the start/stop of wireless charging that is required by some wireless power standard.

In a multi-mode wireless receiver IC that aims to support both inductive and resonant type with the fast charging function, it requires large die area to implement the pass device of LDO, SMPS and PSW separately and make the IC implementation costly. A more cost effective method is to implement the LDO, SMPS and PSW by sharing the same pass device. Furthermore, to achieve high power transfer efficiency performance, using NMOS type FET as its pass device has better efficiency and smaller die area than PMOS type FET pass device.

Implementing the control circuit for sharing the NMOS pass device of LDO, SMPS and PSW requires non-trivial biasing configuration. Bootstrapping technique is well known for the implement of high-side driver of SMPS with NMOS pass device. In PSW mode or a near dropout operating LDO mode, it requires a step-up voltage for powering the LDO and PSW controller. This step-up voltage can be implemented by an on-chip charge pump circuit.

A solution for providing a multi-mode wireless receiver IC that supports both inductive and resonant type with the fast charging function, reduced cost, and improved efficiency is sought.

SUMMARY

In this disclosure, a wireless power receiver IC in which the power path can be reconfigured as either a low-dropout regulator (LDO), a switched-mode power supply (SMPS) or a power switch (PSW) is provided. All three modes share the same pass device to reduce die area and share the same output terminal to reduce pin. In an inductive wireless receiver, the power path can be reprogrammed on the fly to LDO or PSW mode. In a resonant or multi-mode wireless receiver, the power path can be reprogrammed on the fly to SMPS or PSW mode. This more cost effective method implements the LDO, SMPS and PSW by sharing the same pass device. Furthermore, to achieve high power transfer efficiency performance, using N-channel MOSFET as its pass device has better efficiency and smaller die area than PMOS type FET pass device.

In one embodiment, a wireless power receiver integrated circuit comprises a first rectifier input terminal AC1, a second rectifier input terminal AC2, a rectified output terminal VRECT, asynchronous rectifier circuit that receives an input power from AC1 and AC2 and outputs a rectified voltage onto VRECT, and a programmable voltage regulator coupled to VRECT, wherein the programmable voltage regulator is configured to operate as one of a switched-mode power supply (SMPS), a low dropout regulator (LDO), and a power switch (PSW), and wherein the programmable voltage regulator comprises a common pass device that outputs an output voltage onto a common output terminal VOUT.

In one of the circuit implementations, a charge pump is used to provide a boosted voltage to power the LDO/PSW controller. In another circuit implementation, the boosted voltage supply is sourced from the bootstrapped domains of the high-side N-channel MOSFET synchronous rectifier.

In one novel aspect, a power-saving loopback mode in which the efficiently produced voltage output of the SMPS voltage regulator is used to power the internal circuits within the power path. In loopback mode, the SMPS output is routed back to the receiver IC onto a loopback terminal to provide the internal power supply. In one embodiment, a loopback switch is inserted between an internal power supply node and the loopback terminal. The loopback switch is turned on after the SMPS voltage regulator is activated. This improves the system efficiency because the internal power is now efficiently provided through the SMPS voltage regulator rather than being provided by an internal LDO. Typically, a switching mode regulator has better efficiency than LDO when the voltage step down ratio is large.

In another novel aspect, a synchronous rectifier using only n-channel devices in which the low-side switches are effectively cross-coupled using low-side comparators and the high-side switches perform an accurate zero-voltage-switching (ZVS) comparison. The charging path of each bootstrap domain is completed through the rectifier low-side switches, which are each always on for every half-cycle independent of loading. This scheme gives rectifier efficiency gain because a) each bootstrap domain receives maximum charging time, and b) the charging occurs through a switch rather than a diode. Both these factors ensure the bootstrap domain is fully charged, thereby reducing conduction losses through the rectifier switches. Furthermore, settings may be adjusted by software to optimize the resistive and capacitive losses of the rectifier. Using data for die temperature and operating frequency, software can create a feedback loop, dynamically adjusting rectifier settings in order to achieve the best possible efficiency.

Other embodiments and advantages are described in the detailed description below. This summary does not purport to define the invention. The invention is defined by the claims.

BRIEF DESCRIPTION OF THE DRAWINGS

FIG. 2A illustrates a power switch (PSW) with NMOS pass device as one of the operational mode for a programmable wireless power receiver.

FIG. 2B illustrates a low dropout regulator (LDO) with NMOS pass device as one of the operational mode for a programmable wireless power receiver.

FIG. 2C illustrates a switched mode power supply (SMPS) with NMOS pass device as one of the operational mode for a programmable wireless power receiver.

FIG. 3 illustrates different power path modes and their suitability for different types of wireless power systems.

DETAILED DESCRIPTION

Reference will now be made in detail to some embodiments of the invention, examples of which are illustrated in the accompanying drawings.

Figure 1:
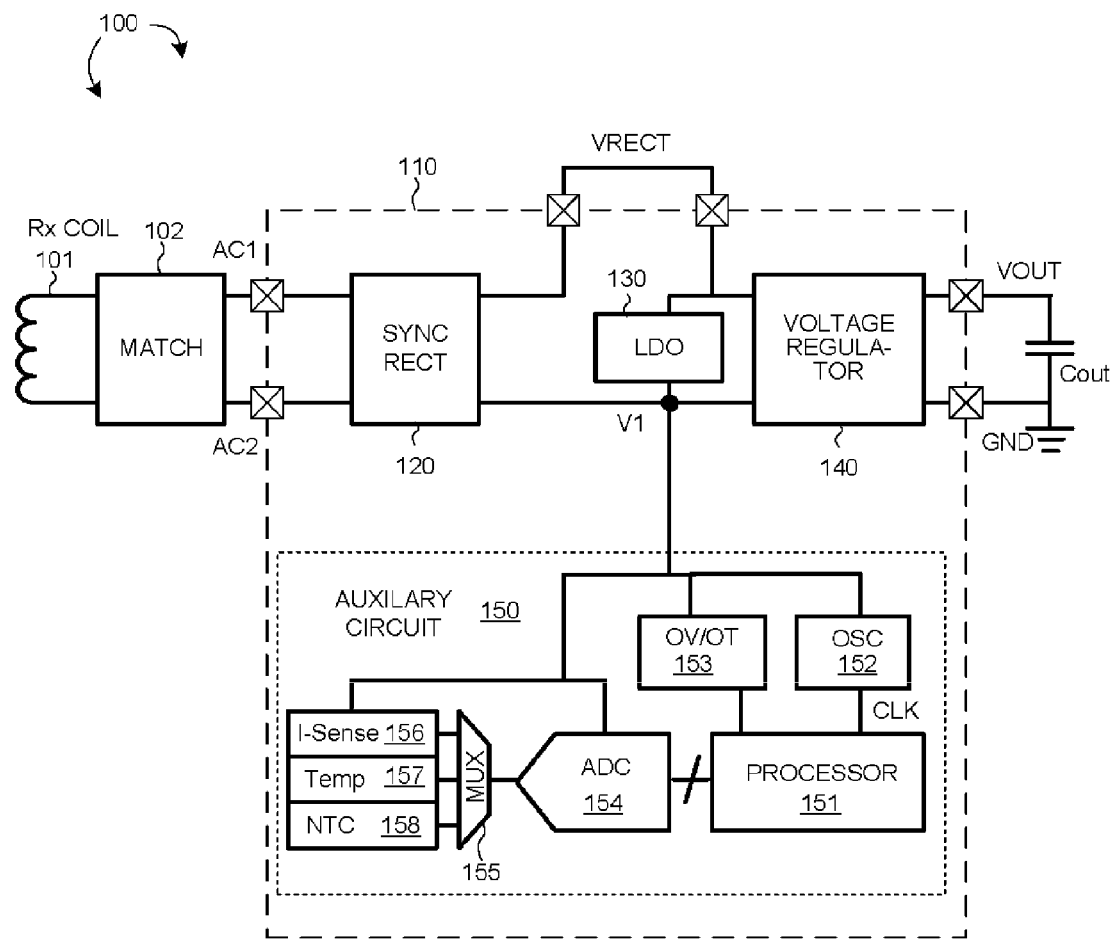
FIG. 1 illustrates a wireless power receiver integrated circuit with programmable power path mode in accordance with one novel aspect.

FIG. 1 illustrates a wireless power receiver 100 having an integrated circuit with programmable power path mode in accordance with one novel aspect. Wireless power receiver 100 comprises a receiver coil 101, a match network 102, and integrated circuit IC 110. Integrated circuit 110 has two input terminals AC1 and AC2, an output terminal VRECT for outputting a rectified voltage (Vrect), a ground terminal GND, and an output terminal VOUT for outputting an output voltage (Vout) to an external circuit. Integrated circuit 110 comprises a synchronous rectifier circuit 120, a low dropout regulator (LDO) 130 for supplying an internal supply voltage V1 from the rectified voltage Vrect, a voltage regulator 140, and auxiliary circuit 150. Auxiliary circuit 150 further comprises a micro-controller (MCU) 151, an oscillator (OSC) 152 for providing internal clock (CLK), an over-voltage and over-temperature protection circuit (OV/OT) 153, an analog-to-digital converter (ADC) 154, a multiplexer MUX 155, a current sensor I-Sense 156, a temperature sensor Temp 157, and a negative temperature coefficient thermistor NTC 158. The auxiliary circuit is powered by the internal supply voltage V1, which is provided by LDO 130 onto an internal node V1.

Wireless receiver 100 converts magnetic field energy to AC electrical energy using receiver coil 101 and matching network 102. Integrated circuit 110 receives the AC signal from input terminals AC1 and AC2 and then converts the AC power to a rectified DC voltage onto output terminal VRECT, finally to a an output voltage onto output terminal VOUT.

In accordance with one novel aspect, integrated circuit 110 has voltage regulator 140 where its power path can be reconfigured as either a low dropout regulator (LDO), a switched-mode power supply (SMPS), or a power switch (PSW). All three modes share the same pass device to reduce die area and share the same output terminal to reduce terminal pin. In an inductive wireless receiver, the power path can be reprogrammed on the flyby either software or firmware to LDO or PSW mode. In a resonant or multi-mode wireless receiver, the power path can be reprogrammed on the fly by either software or firmware to SMPS or PSW mode. A more cost effective method is to implement the LDO, SMPS and PSW by sharing the same pass device. Furthermore, to achieve high power transfer efficiency performance, using N-channel MOSFET as its pass device has better efficiency and smaller die area than P-channel MOSFET pass device.

FIG. 2A illustrates a power switch (PSW) 210 with N-channel MOSFET pass device as one of the operational mode for a programmable wireless power receiver. In PSW mode, the wireless power receiver directly connects the rectifier output (Vrect) to a fast charging charger. PSW 210 comprises a step up charge pump 211, a PSW controller 212, and a power switch device, which is an N-channel LDMOS transistor 213. LDMOS transistor 213 is designed to withstand a large voltage stress across the drain-to-source junction. This type of device allows the wireless power receiver to operate at Vrect that is higher than the gate-oxide breakdown voltage of the MOSFETs. In order to drive the gate voltage of this N-channel LDMOS power switch device 213, a voltage must be generated that is roughly equal to the rectified voltage (Vrect) plus the largest voltage that can be applied safely across the device gate, labeled as V1 here. In this well-known implementation, the step up charge pump 211 generates a voltage (Vrect+V1) to power the PSW controller 212. The PSW controller 212 is designed to bias the N-channel LDMOS pass device 213 at its maximum allowable $V_{GS}$ voltage to achieve low on-resistance.

FIG. 2B illustrates a low dropout regulator (LDO) 220 with N-channel LDMOS pass device as one of the operational mode for a programmable wireless power receiver. LDO 210 comprises a step up charge pump 221, an LDO controller 222, and an N-channel LDMOS transistor 223. The LDO controller 222 is designed to regulate a suitable $V_{GS}$ voltage across the N-channel LDMOS 223 using closed loop control by feeding back the output voltage Vout to the LDO controller 222. LDO controller 222 regulates $V_{GS}$ by comparing the feedback voltage with a known reference voltage Vref, e.g., provided by an internal voltage from bandgap circuit. Under LDO dropout condition when the output voltage Vout is very close to the rectified voltage Vrect, it is required to generate a higher than Vrect voltage to control the gate voltage of the pass device N-channel LDMOS 223. One possible implementation is to use a charge pump circuit 221, which is the same as the step up charge pump 211 for PSW 210 in FIG. 2A. In inductive wireless powering, the rectifier voltage (Vrect) is set close to the target LDO output voltage Vout. Operating the LDO near the dropout condition allows the voltage regulator to achieve good system efficiency, because the efficiency of an LDO voltage regulator is roughly equal to the output voltage Vout divided by the input voltage Vrect.

FIG. 2C illustrates a switched mode power supply (SMPS) 230 with N-channel MOSFET pass device as one of the operational mode for a programmable wireless power receiver. The SMPS here is also referred to as a buck converter, where a higher input voltage Vrect is converted to a lower regulated voltage Vreg via the buck converter and external components including inductor Lind and capacitor Cout. SMPS operation mode is applied for better efficiency when the voltage step down ratio (from Vrect to Vreg) is large. SMPS 230 comprises a buck mode controller 231, a buck mode pre-driver 232, and an N-channel LDMOS 233. Due to the switching characteristic of SMPS 230, a bootstrapping circuit is used to power the buck mode pre-driver 232. The bootstrapping circuit comprises a diode 235 and a boost capacitor Cboost. When the output voltage Vout (BUCK_SW) is low, V1 charges Cboost through diode 235. The pre-driver 232 operates at the floating power domain between BUCK_SW and BUCK_BST. The Low side pass device could be a power diode for non-synchronous SMPS or an N-channel LDMOS pass device for synchronous SMPS. The description here uses the non-synchronous SMPS configuration with a power diode 236 as a non-limiting example.

Figure 4A:
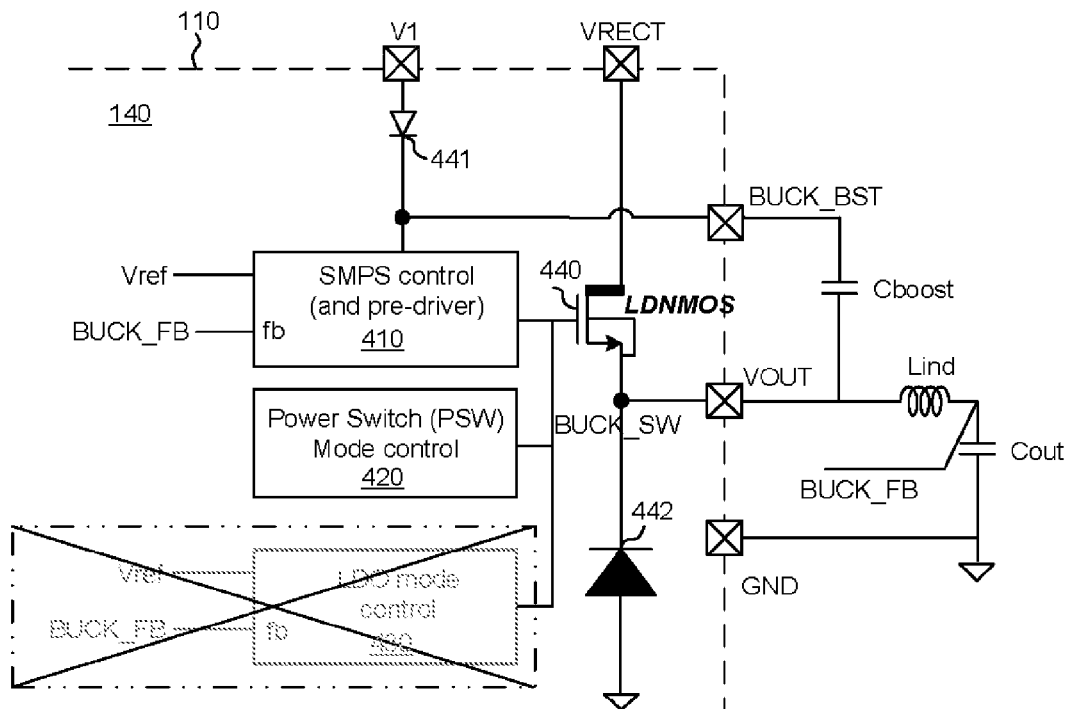
FIG. 4A illustrates the power paths for programming a voltage regulator to SMPS or PSW mode.
Figure 4B:
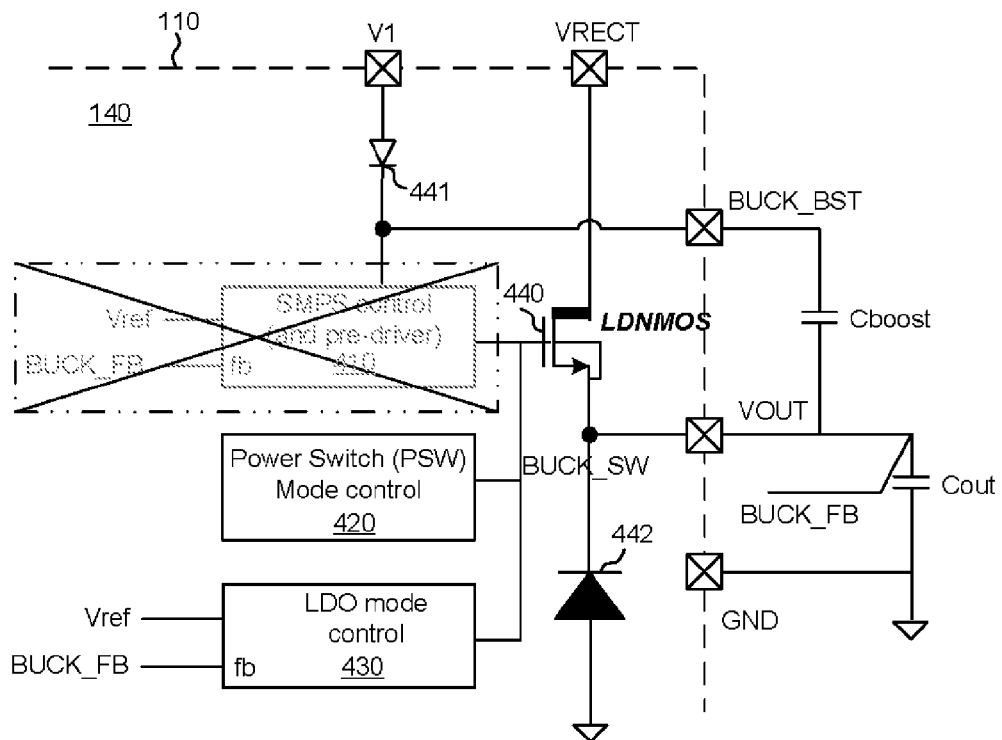
FIG. 4B illustrates the power paths for programming a voltage regulator to LDO or PSW mode.

FIG. 3 illustrates different power path modes and their suitability for different types of wireless power systems. Any of the modes are suitable for a single-receiver charging system. A dual-mode LDO/PSW receiver provides the option to regulate voltage or pass an unregulated voltage, perhaps for a high-voltage, fast-charging mode. For an inductive/resonant dual mode wireless charging system, the power path can be set to SMPS/PSW mode. PSW mode provides good efficiency without use of an external inductor, but the subsequent stage must be able to tolerate a wide voltage range. As such, it is not suitable for use in systems in which a well-controlled voltage is expected, such as is typically the case in a wired charging system FIG. 4A illustrates one embodiment of the power paths for programming a voltage regulator to SMPS or PSW mode. FIG. 4B illustrates another embodiment of the power paths for programming a voltage regulator to LDO or PSW mode. In both embodiments, integrated circuit 110 of FIG. 1 comprises a programmable voltage regulator 140. Programmable voltage regulator 140 further comprises an SMPS controller 410, a PSW mode controller 420, an LDO mode controller 430, a pass device 440, a diode 441 for bootstrapping, and a low side pass device 442. Voltage regulator 140 belongs to the wireless power receiver integrated circuit 110. The components external to IC 110 include a bootstrapping capacitor Cboost, an inductor Lind, and a decoupling capacitor Cout.

The power path of the voltage regulator 140 provides LDO, SMPS and PSW modes and these three modes share the same NMOS type pass device 440. The outputs of the three controllers are wired together and connect to the gate of the NMOS type pass device 440. When the wireless receiver system starts operating, the multi-mode receiver IC first detects whether it is operating in inductive mode or in resonant mode. For example, the synchronous rectifier 120 of the wireless receiver IC 110 can detect the AC signal frequency and determine inductive or resonate mode based on the frequency, e.g., 100 k-200 kHz for inductive mode, 6.78 MHz for resonate mode.

In the example of FIG. 4A, the power path of the voltage regulator 140 is programmed to SMPS or PSW mode for resonate or inductive mode wireless power receiving. The external inductor (Lind) and decoupling capacitor (Cout) are required for SMPS mode operation. In PSW mode, it can function correctly either directly connected to Cout or connected to Cout through Lind. The LDO controller 430 is turned off for resonate mode receiver.

In the example of FIG. 4B, the power path of the voltage regulator 140 is programmed to LDO or PSW mode for inductive mode wireless power receiving. In LDO mode, the LDO output connects directly to the decoupling capacitor (Cout) and does not require the bulky and costly external inductor (Lind). In PSW mode, it can function correctly either directly connected to Cout or connected to Cout through Lind. The SMPS controller 410 is turned off for inductive mode receiver.

Using the configurations of FIGS. 4A and 4B, the software/firmware on the receiver IC 110, e.g., via microcontroller MCU 151, can either program the power path to SMPS or PSW mode on the fly or program the power path to LDO or PSW mode on the fly for inductive mode operation. In one example, the multi-mode receiver IC determines whether to program the power path to PSW mode based on whether the external charging circuit supports fast charging at a higher input voltage (e.g., ~20V) or not. Note that the pass device (N-channel LDMOS 440) dominates the wireless receiver silicon die area because it is required to deliver large power to the output. Using N-channel MOSFET as its pass device has better efficiency and smaller die area than P-channel MOSFET pass device. In addition, because all three modes share the same N-channel MOSFET pass device, the circuit die area overhead to support multi-mode is small. Furthermore, all three modes share the same output terminal VOUT to support multi-mode with reduce the total number of terminal pins.

Figure 5:
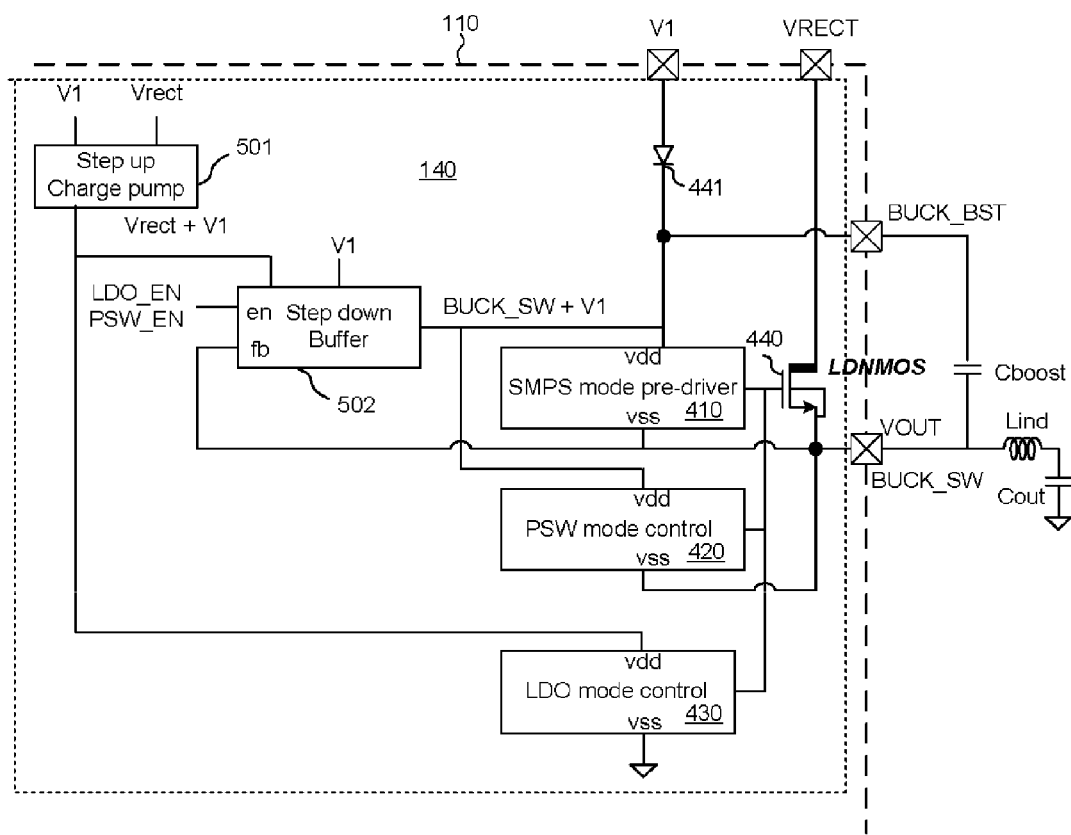
FIG. 5 illustrates a first embodiment of a wireless receiver IC with multi-mode power paths.

FIG. 5 illustrates a first embodiment of a wireless receiver IC 110 with multi-mode power paths. This circuit can be used in cases where the rectified voltage Vrect is higher than the allowable gate-to-source voltage ($V_{GS}$) for the IC. The N-channel LDMOS pass device can tolerate the large drain-to-source voltage ($V_{DS}$), while the $V_{GS}$ tolerance is limited and provided by the internal supplies (V1). The driving logic circuit in SMPS mode pre-driver and PSW mode control are composed of regular MOSFET devices, therefore their drain-to-source voltage has the same limitation as their gate-to-source voltage (V1).

A charge pump 501 is used to provide the step-up voltage (Vrect+V1) for the powering of LDO controller 430 and a step-down buffer 502. The step-down buffer 502 is used to generate (VBUCK_SW+V1) voltage to supply the PSW mode controller 420 and it is wired-connected to BUCK_BST. At LDO mode, both the SMPS mode pre-driver 410 and PSW mode control 420 are disable and set its output to high impedance. Powering the SMPS mode pre-driver 410 and PSW mode control 420 by the step-down buffer can guarantee the logic level correctness and prevent reverse leakage path from controller output to its power supply. At SMPS mode, the output of step-down buffer 502 is floating and BUCK_BST voltage is generated by the bootstrapping circuit (that comprises diode 441 and Cboost). Both the output of PSW mode and LDO mode controller are set at high impedance condition. At PSW mode, the step-down buffer 502 is enabled to power the PSW mode controller 420 and SMPS mode pre-driver 410. Output of SMPS mode pre-driver 410 and LDO mode controller 430 are disabled and set to high impedance. Through the above configuration, the three power path modes can operate with the same N-channel MOSFET pass device 440 without interference to each other.

Figure 6:
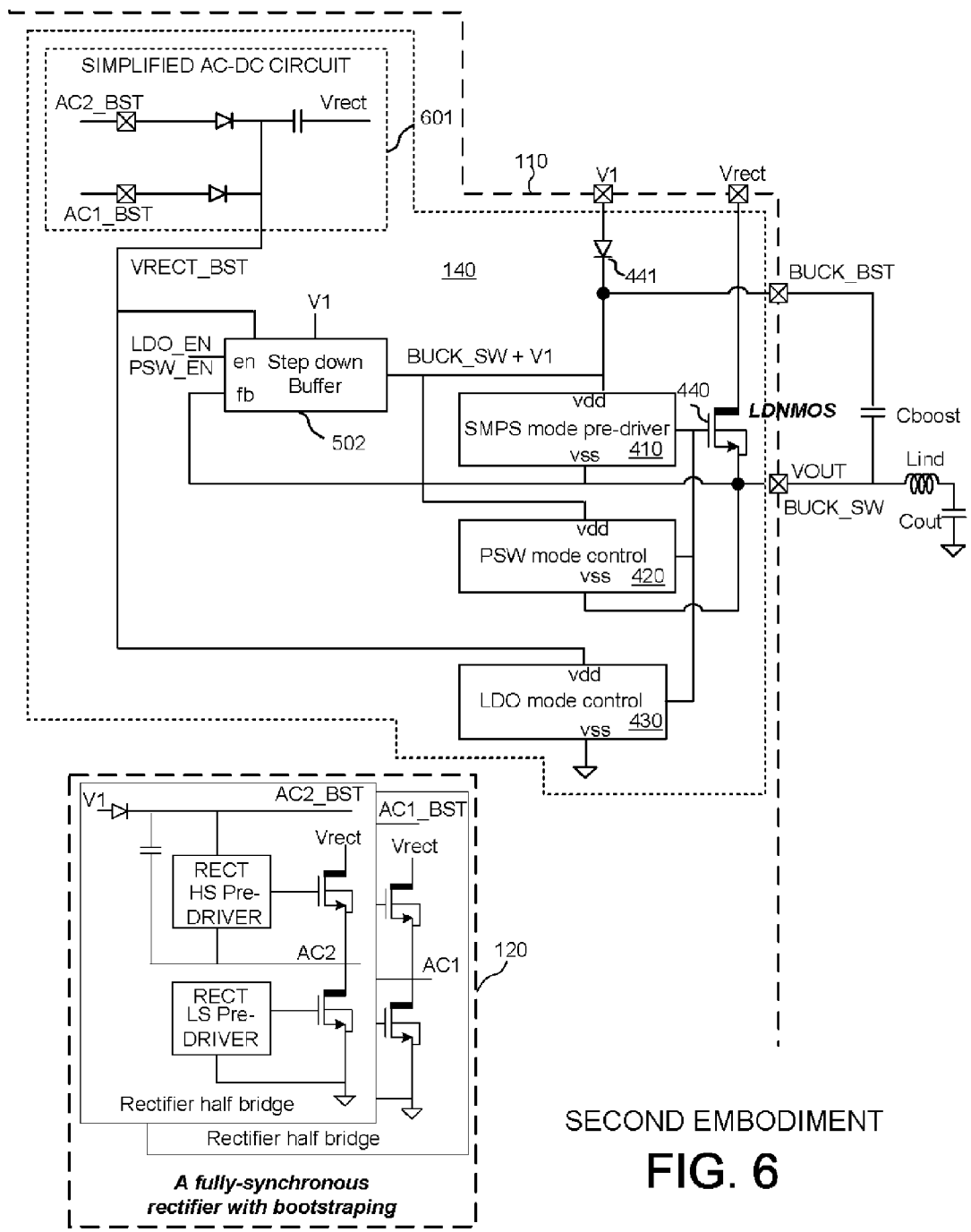
FIG. 6 illustrates a second embodiment of a wireless receiver IC with multi-mode power paths.

FIG. 6 illustrates a second embodiment of a wireless receiver IC 110 with multi-mode power paths. The operation of FIG. 6 is similar to the previous proposed architecture in FIG. 5. However, the input step-up charge pump 501 in FIG. 5 is replaced by a simplified AC-DC rectifier circuit 601 of FIG. 6. AC1_BST and AC2_BST are the bootstrapping domain power from the fully synchronous rectifier circuit 120 of FIG. 1. AC1_BST and AC2_BST track the AC1 and AC2 plus the V1 voltage, respectively. The fully synchronous rectifier circuit 120 of IC 110 is reused here by the voltage regulate 140 to implement a simple step-up charge pump. The simplified AC-DC rectifier circuit 601 comprises diode 611, diode 612, and capacitor 613. The simplified AC-DC rectifier circuit 601 generates a voltage VRECT_BST which level is around VRECT+V1. VRECT_BST is used for the powering of LDO controller 430 and step-down buffer 502. All the diode forward voltage is assumed small enough compare to V1 and is ignored here.

Figure 7:
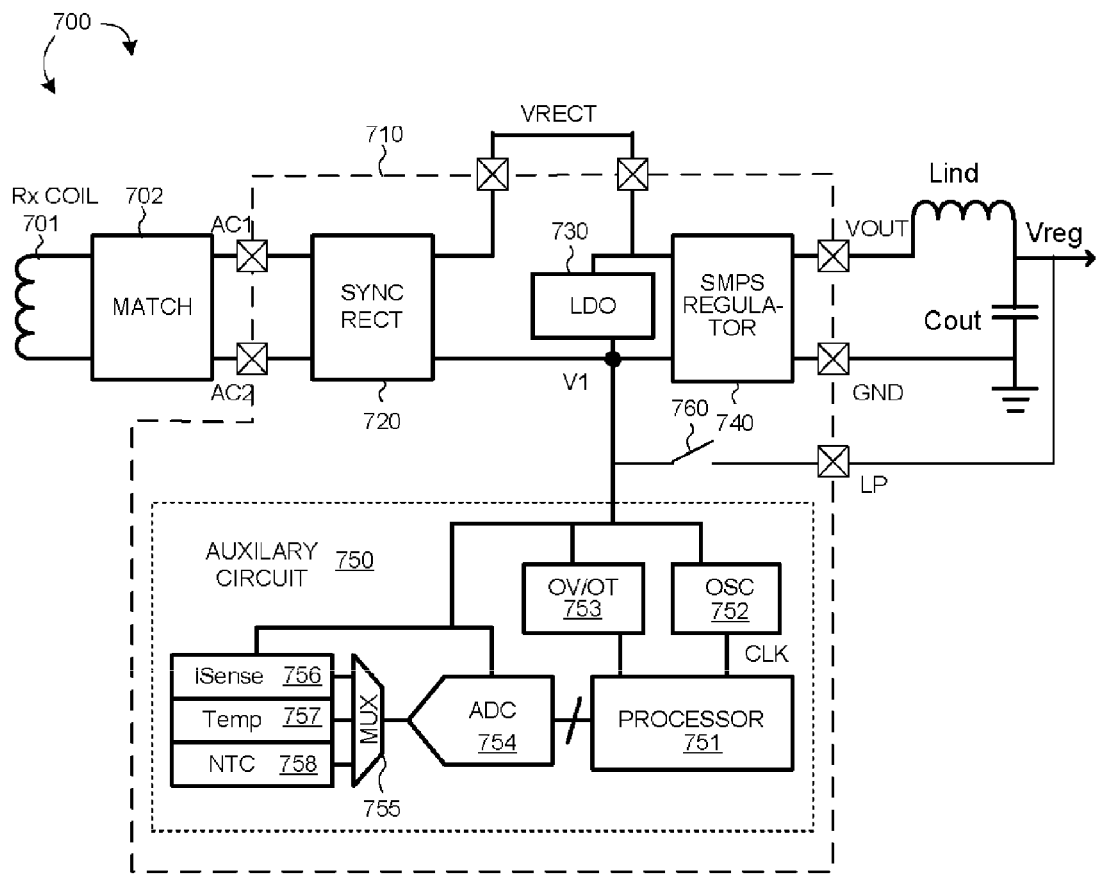
FIG. 7 illustrates a wireless receiver IC with loopback mode in accordance with one novel aspect.

FIG. 7 illustrates a wireless receiver 700 having an integrated circuit with loopback mode in accordance with one novel aspect. Wireless power receiver 700 comprises a receiver coil 701, a match network 702, and an integrated circuit IC 710. Integrated circuit 710 has two input terminals AC1 and AC2, an output terminal VRECT for outputting a rectified voltage (Vrect), a ground terminal GND, an output terminal VOUT for outputting an output voltage (Vout) to an external circuit, and a loopback terminal LP for looping back a regulated voltage (Vreg) back into the integrated circuit 710. Integrated circuit 710 comprises a synchronous rectifier circuit 720, a low dropout regulator (LDO) 730 for providing an internal supply voltage V1 from the rectified voltage Vrect, an SMPS voltage regulator 740, and an auxiliary circuit 750. Auxiliary circuit 750 further comprises a micro-controller (MCU) 751, an oscillator (OSC) 752 for providing internal clock (CLK), an over-voltage and over-temperature protection circuit (OV/OT) 753, an analog-to-digital converter (ADC) 754, a multiplexer MUX 755, a current sensor I-Sense 756, a temperature sensor Temp 757, and a negative temperature coefficient thermistor NTC 758. The auxiliary circuit is powered by the internal supply voltage V1, which is provided by LDO 730 onto an internal node V1.

Wireless receiver 700 converts magnetic field energy to AC electrical energy using receiver coil 701 and matching network 702. Integrated circuit 710 receives the AC signal from input terminals AC1 and AC2 and then converts the AC power to a rectified DC voltage onto output terminal VRECT, and finally to an output voltage onto output terminal VOUT, the output voltage can be regulated via external components including an inductor Lind and a decoupling capacitor Cout.

Typically, V1 is the largest voltage that can be applied safely across the device gate and is usually regulated from the rectified voltage Vrect through an internal LDO, e.g., LDO 730. In addition to powering the driver circuits of the SMPS voltage regulator 740 and the synchronous rectifier 720, V1 is also used to power the auxiliary circuit 750 of IC 710. Operating the LDO near the dropout condition allows the LDO to achieve good system efficiency, because the efficiency of the LDO is roughly equal to the output voltage divided by the input voltage. As a result, when the input voltage is much higher than the output voltage, the system efficiency of the LDO voltage regulator becomes very poor.

In accordance with one novel aspect, after the SMPS voltage regulator 740 has been activated, a power-saving loopback mode can be used. As shown in FIG. 7, in loopback mode, the SMPS output is routed back to the receiver IC 710 onto terminal LP to provide voltage onto node V1. This is achieved by inserting a loopback switch 760 between node V1 and terminal LP. If the regulated voltage Vreg is substantially equal to the voltage V1, e.g., both voltages equal to ~5V, then the loopback switch 760 is turned on after SMPS voltage regulator 740 is activated. This improves the system efficiency because the V1 voltage is now efficiently provided through the SMPS voltage regulator 740 rather than being provided by LDO 730 at an efficiency of V1/Vrect. Typically, a switching mode regulator operates with better efficiency as compared to LDO when the voltage step down ratio is large. On the other hand, if the regulated voltage Vreg is much higher than the voltage V1, then the loopback switch 760 is turned off and the internal supply voltage V1 is provided by LDO 730. In one embodiment, the loopback switch can be implemented by a p-channel MOSFET.

Figure 8:
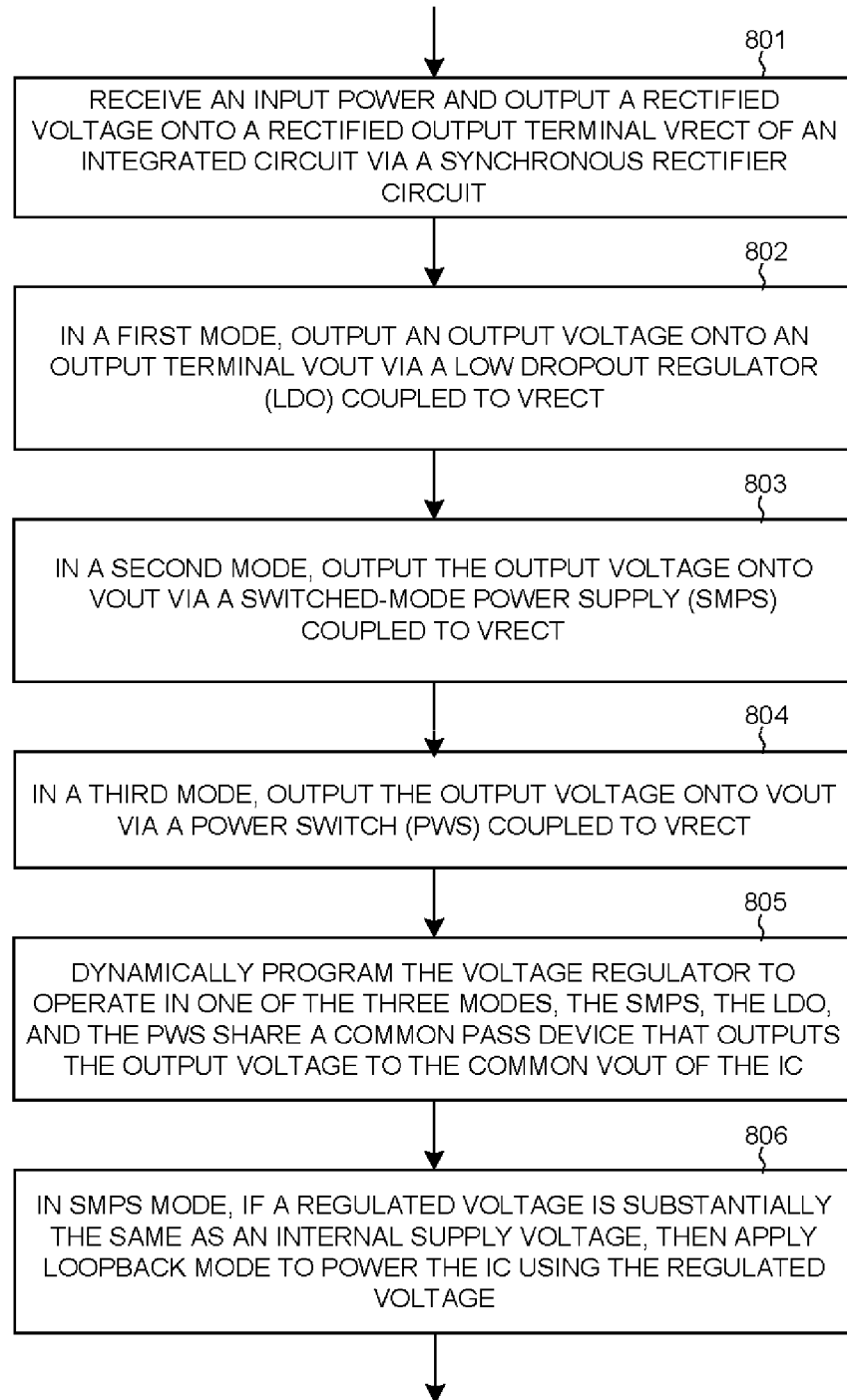
FIG. 8 is a flow chart of a method of supporting multi-mode power paths for a wireless receiver IC in accordance with one novel aspect.

FIG. 8 is a flow chart of a method of supporting multi-mode power paths for a wireless receiver IC in accordance with one novel aspect. In step 801, a synchronous rectifier circuit receives an input power and outputs a rectified voltage onto a rectified output terminal VRECT of an integrated circuit (IC). The IC comprises a programmable voltage regulator in which the power path can be reconfigured as either a low-dropout regulator (LDO), a switched-mode power supply (SMPS) or a power switch (PSW). In step 802, in a first mode, the IC outputs an output voltage onto an output terminal VOUT via the low dropout regulator (LDO) coupled to VRECT. In step 803, in a second mode, the IC outputs the output voltage onto VOUT via the switched-mode power supply (SMPS) coupled to VRECT. In step 804, in a third mode, the IC outputs the output voltage onto VOUT via the power switch (PWS) coupled to VRECT. In step 805, the IC dynamically programs the voltage regulator to operate in one of the three modes, wherein the SMPS, the LDO, and the PWS share a common pass device that outputs the output voltage to the common VOUT of the IC.

In SMPS mode, the output voltage is used to provide a regulated voltage through an external inductor. In step 806, if the regulated voltage is substantially the same as an internal supply voltage, then a loopback mode is applied to route the regulated voltage back to the integrated circuit. The loopback mode improves system efficiency because a switching mode regulator such as SMPS has better efficiency than LDO when the voltage step down ratio is large. The loopback mode can be implemented by a switch (e.g., a P-channel MOSFET) that can be turned on and off based on the regulated voltage.

Synchronous Rectifier

A rectifier is an electrical device that converts alternating current (AC), which periodically reverses direction, to direct current (DC), which flows in only one direction. Rectifier circuits may be single-phase or multi-phase (three being the most common number of phases). In half-wave rectification, either the positive or the negative half of the AC wave is passed, while the other half is blocked. A full-wave rectifier converts the whole of the input waveform to one of constant polarity at its output. Full-wave rectification converts both polarities of the input waveform to pulsating DC, and yields a higher average output voltage.

Figure 9:
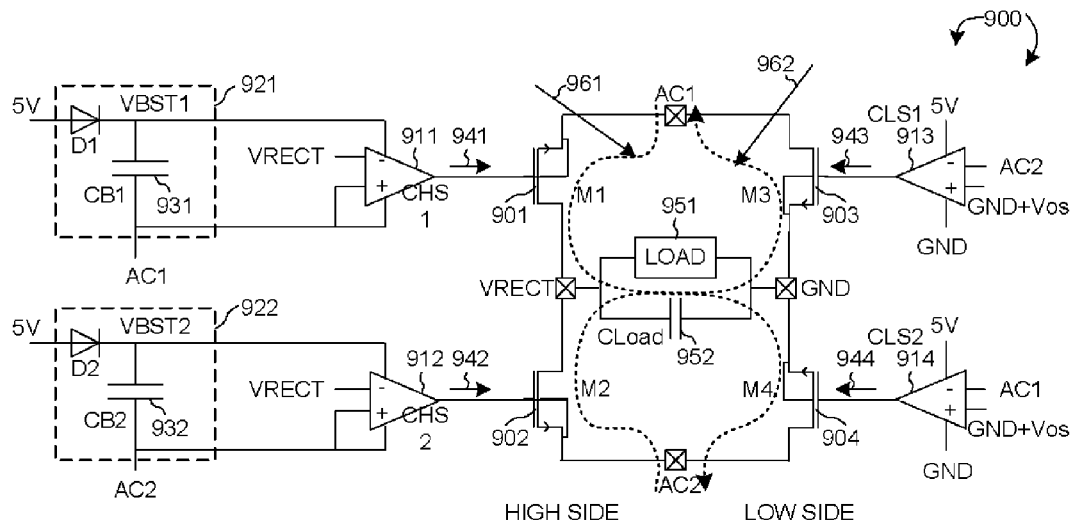
FIG. 9 illustrates a synchronous rectifier in accordance with one novel aspect.

FIG. 9 illustrates a synchronous rectifier 900 in accordance with one novel aspect. Rectifier circuit 900 comprises a first high side switch 901 (M1), a second high side switch 902 (M2), a first low side switch 903 (M3), and a second low side switch 904 (M4) that form a full-wave bridge synchronous rectifier circuit. The source of M1 and the drain of M3 are coupled to a first input node AC1. The source of M2 and the drain of M4 are coupled to a second input node AC2. The drain of M1 and the drain of M2 are coupled to an output node VRECT for outputting a rectified output voltage Vrect. The source of M3 and the source of M4 are coupled to a ground node GND.

The high side switches M1 and M2 are controlled by a first high side comparator 911 (CHS1) and a second high side comparator 912 (CHS2), respectively. The first high side comparator CHS1 operates in a bootstrap domain between VBST1 and AC1, which is provided by a first bootstrapping circuit 921. Bootstrapping circuit 921 comprises a diode D1 and a bootstrapping capacitor 931 (CB1), and provides a bootstrapped voltage VBST1=AC1+5V to comparator CHS1. CHS1 compares the voltage on node VRECT with the voltage on node AC1 and outputs a first control signal 941 to control the gate of M1. Similarly, the second high side comparator CHS2 operates in a bootstrap domain between VBST2 and AC2, which is provided by a second bootstrapping circuit 922. Bootstrapping circuit 922 comprises a diode D2 and a bootstrapping capacitor 932 (CB2), and provides a bootstrapped voltage VBST2=AC2+5V to comparator CHS2. CHS2 compares the voltage on node VRECT with the voltage on node AC2 and outputs a second control signal 942 to control the gate of M2. The high-side devices perform an accurate zero-voltage-switching (ZVS) comparison.

The low side switches M3 and M4 are controlled by a first low side comparator 913 (CLS1) and a second low side comparator 914 (CLS2), respectively. The low side switches M3 and M4 are effectively cross-coupled via the low side comparators CLS1 and CLS2. Specifically, CLS1 compares the voltage on node AC2 with a ground voltage plus a small offset voltage Vos and outputs a third control signal 943 to control the gate of M3. On the other hand, CLS2 compares the voltage on node AC1 with a ground voltage plus a small offset voltage Vos and outputs a fourth control signal 944 to control the gate of M4. Based on this architecture, the low side switches M3 and M4 are effectively cross-coupled.

Figure 10:
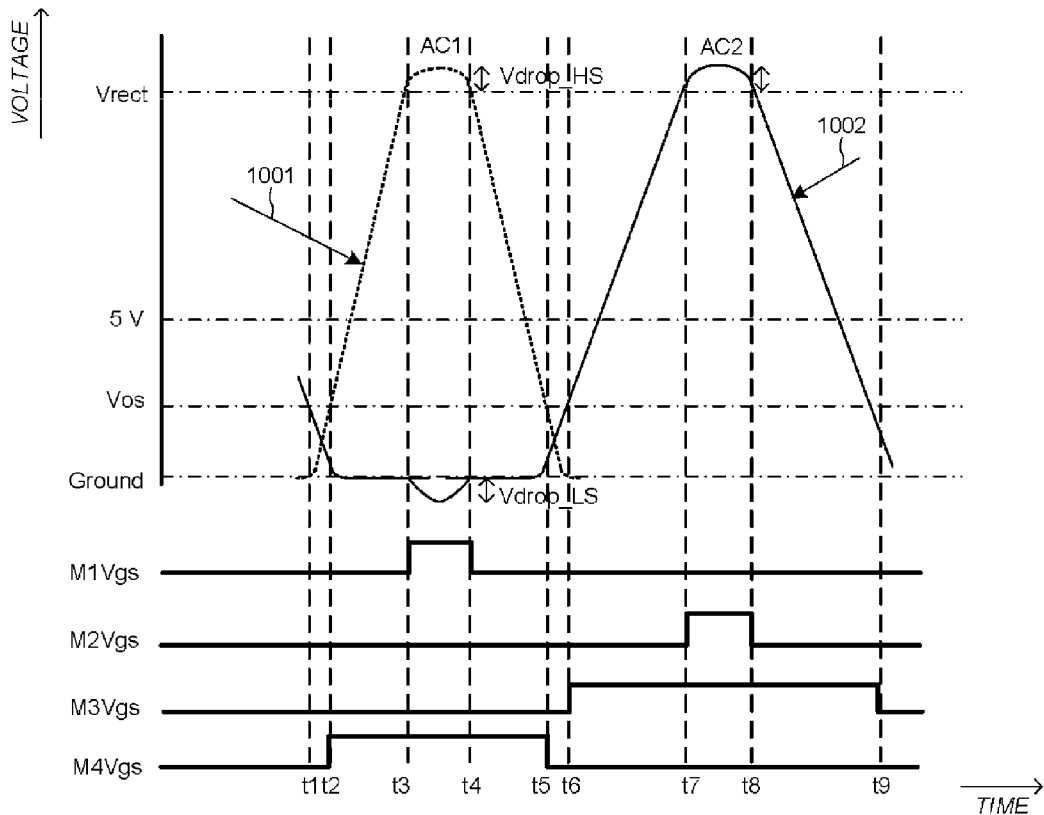
FIG. 10 illustrates waveforms of the synchronous rectifier in FIG. 9.

FIG. 10 illustrates an example of waveforms of the synchronous rectifier 900 in FIG. 9. In the example of FIG. 10, the dotted line 1001 depicts the waveform of the voltage on node AC1, and the solid line 1002 depicts the waveform of the voltage on node AC2. Due to the cross coupling of the low side switches, the waveforms of AC1 and AC2 are not symmetric. Control signal 941 from high side comparator CHS1 controls Vgs for high side switch M1, control signal 942 from high side comparator CHS2 controls Vgs for high side switch M2, control signal 943 from low side comparator CLS1 controls Vgs for low side switch M3, and control signal 944 from low side comparator CLS2 controls Vgs for low side switch M4.

As shown in FIG. 10, for high side switches M1 and M2, when AC1 rises above Vrect (from time t3 to t4), control signal 941 turns on M1. When AC2 rises above Vrect (from time t7 to t8), control signal 942 turns on M2. For low side switches M3 and M4, when AC1 rises above GND+Vos (at time t2), control signal 944 turns on M4 and clamps AC2 to ground. When AC1 drops below GND+Vos (at time t5), control signal 944 turns off M4. When AC2 rises above GND+Vos (at time t6), control signal 943 turns on M3 and clamps AC1 to ground. When AC2 drops below GND+Vos (at time t9), control signal 943 turns off M3. The small offset voltage Vos (e.g., Vos=0.5 v) provides a safe gap between time t5 and t6 so that the low side switches M3 and M4 are not simultaneously turned on.

It can be seen that switches M1 and M4 are both turned on from time t3 to t4, while switches M2 and M3 are both turned on from time t7 to t8. Referring back to FIG. 9, a dashed line 961 in FIG. 9 depicts a first Vrect charging path when both M1 and M4 are turned on. Current flows from node AC1, through switch M1, through node VRECT, through load 951 and a capacitor 952 (Cload), through node GND, through switch M4, and finally to node AC2. Similarly, in the opposite direction, a dashed line 962 in FIG. 9 depicts a second Vrect charging path when both M2 and M3 are turned on. Current flows from node AC2, through switch M2, through node VRECT, through load 951 and Cload 952, through node GND, through switch M3, and finally to node AC1. The two Vrect charging paths provide the rectified output voltage Vrect onto the output node VRECT. Since the AC1 and AC2 voltages can exceed the max Vgs (e.g., V1=5V) of the circuit, the implementation utilizes hysteretic comparators and a bootstrapped domain to be able to drive the rectifier switches without violating process tolerances.

In accordance with one novel aspect, the bootstrap domain charging path is completed through the rectifier low side switches M3 and M4, which are always on for a half-cycle. This scheme improves rectifier efficiency gain because a) each bootstrap domain receives maximum charging time; and b) the charging occurs through a switch rather than a diode. Both these factors ensure the bootstrap domain is fully charged and thereby reducing conduction losses through the rectifier switches. As a result, the low side switches share the role of performing both rectification and charging the bootstrap domain. As illustrated in FIG. 10, in a first half-cycle, low side switches M4 is turned on from time t2 to time t5 to complete the bootstrap-domain charging path. In a second half-cycle, low side switch M3 is turned on from time t6 to t9 to complete the bootstrap-domain charging path. This is independent from loading. Loading modulates the high side conduction time but not the low side.

Figure 11:
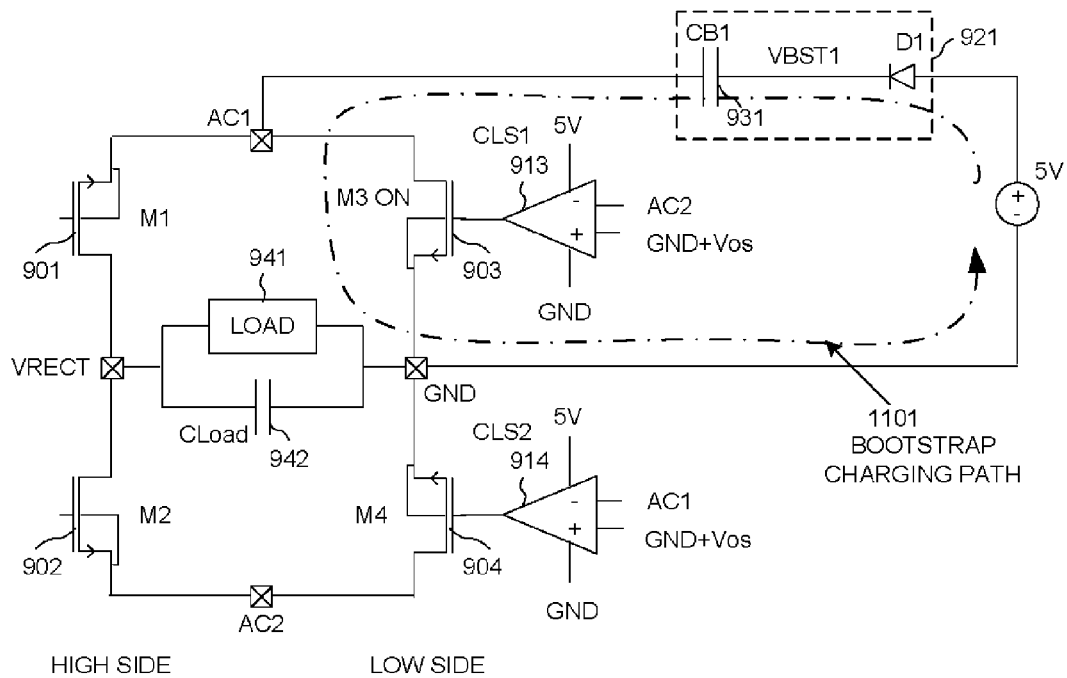
FIG. 11 illustrates a bootstrap charging path for the synchronous rectifier in FIG. 9.

FIG. 11 illustrates a bootstrap charging path for synchronous rectifier 900 in FIG. 9. When the input voltage on node AC2 rises above GND+Vos, low side switch M3 is turned on, which clamps the input voltage on node AC1 to ground. This provides a convenient and loading-independent charging path for bootstrapping circuit 921. As depicted by line 1101 representing the bootstrap-domain charging path, current flows from the 5V internal power supply, through diode D1, to node VBST1, through CB1, to node AC1, and to node GND when AC1 drops below 5V. When input voltage on node AC1 rises above GND+Vos, low side switch M4 is turned on, which clamps input voltage on node AC2 to ground. This provides a convenient and loading-independent charging path for bootstrapping circuit 922. Similar to line 1101 representing the bootstrap-domain charging path (but not shown), current flows from the 5V internal power supply, through diode D2, to node VBST2, through CB2, to node AC2, and to node GND when AC2 drops below 5V. In this scheme, the low side conduction time is loading-independent. The cross-coupled low side switches M3 and M4 always turn on every cycle once the voltage on AC2 and AC1 rises above GND+Vos.

Figure 12:
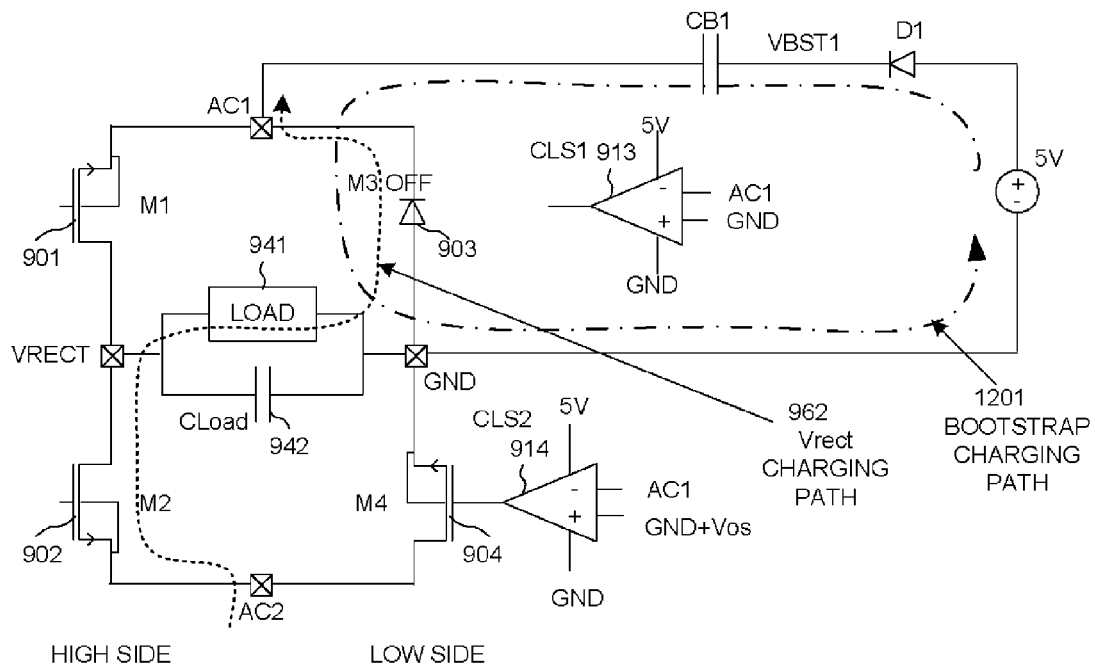
FIG. 12 illustrates a bootstrap charging path without cross-coupling using low side comparators.

If the low side conduction time was loading-dependent, and loading was light, then M3 would not turn on. FIG. 12 illustrates a bootstrap charging path without cross-coupling using low side comparators. In the example of FIG. 12, the low side comparator CLS1 compares input voltage on node AC1 with ground, and outputs a control signal to control the gate of M3. M3 is off when load 941 is light. Current would then flow through the M3 body diode to complete the bootstrap-domain charging path 1201. However, this direction is in the opposite direction of the Vrect charging path 962. The act of charging the BST diode thus tends to turn off the diode. As a result, a minimum output loading would be required to forward bias the diode to be always on. On the other hand, the cross-coupled low side switches M3 and M4 in FIG. 11 are always turned on for every cycle independent from loading. Therefore, the proposed scheme imposes no minimum output loading requirements.

The high-side and low-side comparators include settings that can be adjusted on the fly to fine tune the comparator threshold and comparator hysteresis level. In addition, synchronous switching can be disabled, allowing the rectifier to operate using the passive body diodes. Settings may be adjusted to optimize the resistive and capacitive losses of the rectifier as well as the level of electromagnetic interference generated. The optimal settings may be different depending on the conditions of operation.

The implementation for the comparators has several adjustable "knobs" including: 1) comparator drive strength: due to the large variation in AC operating frequencies, the comparator drive strength has to be made adjustable. Very large drive strengths at low operating frequencies can cause needless RF emissions, interfering with cellular operation. Moreover, very large drive strengths at low operating frequencies can also cause oscillations in the comparator output which increase gate switching losses and are bad for efficiency. Therefore, the comparator drive strength was made adjustable for both low side and high side comparators. 2) High side and low side comparator threshold: due to parasitic inductances, the AC inputs can ring when the rectifier switches turn on, and the extent of ringing can depend on factors such as output power, rectifier voltage, etc. This ringing can potentially cause false triggers of the high side comparator even with hysteresis, therefore increasing gate-switching losses, which are significant at high operating frequencies. Making the high-side comparator threshold adjustable allows decreasing these false triggers. Making the high-side comparator threshold adjustable also allows minimization of reverse current, which can be caused if the threshold is too low. For low-side comparators, the offset voltage Vos can be adjusted to control the bootstrap domain charging time. 3) Selective diode mode: at times, it may be desirable to operate a switch in diode mode as opposed to synchronous mode. For example, in Qi mode when no power is being provided from the charger, synchronous mode can needlessly create 1 MHz resonance oscillations in the AC input. Therefore, both the low side and high side switches can be independently be turned into pure diodes, turning the synchronous function.

Figure 13:
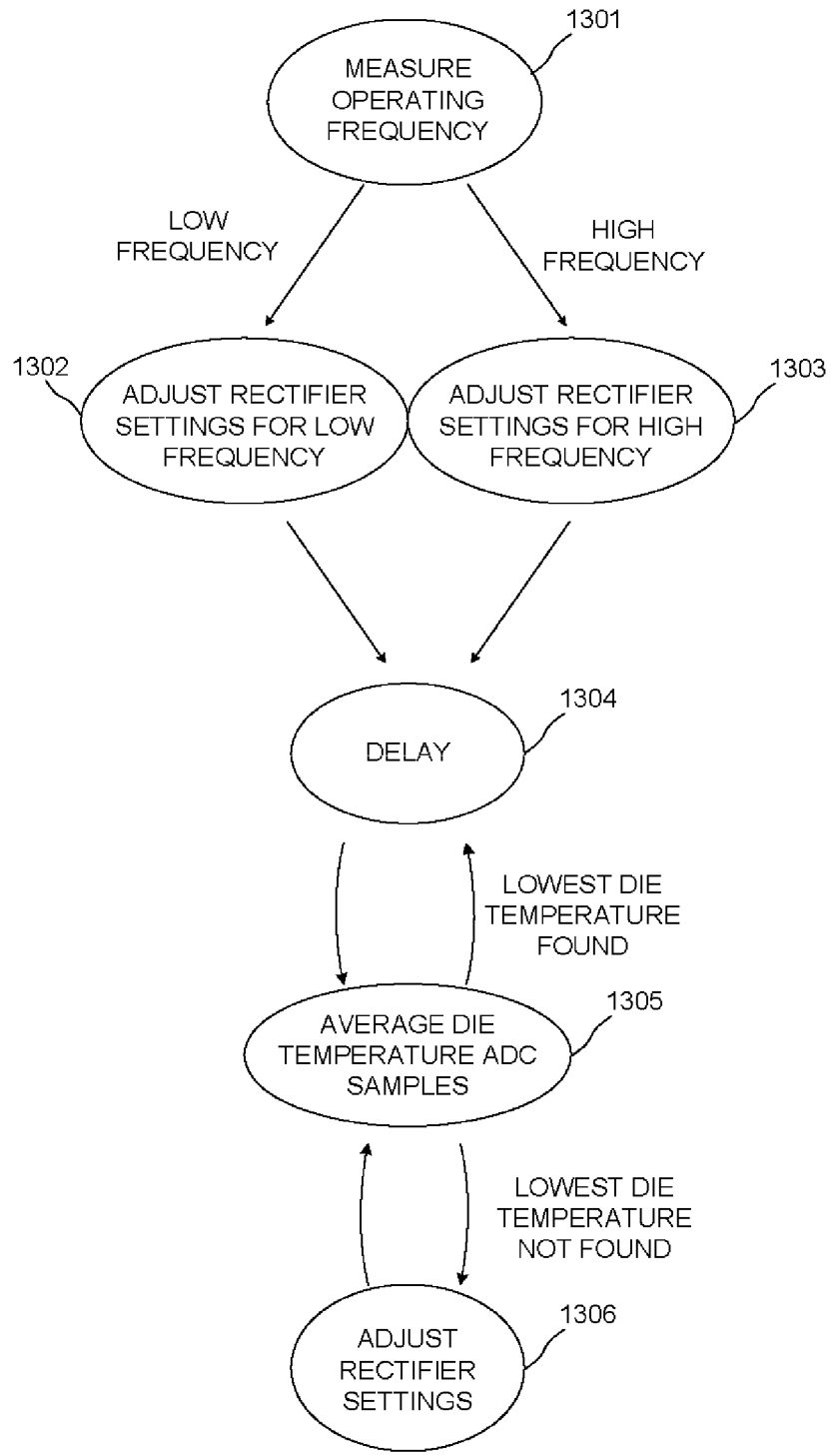
FIG. 13 illustrates a software-based feedback loop of adjusting rectifier settings for optimizing rectifier performance.

FIG. 13 illustrates a software-based feedback loop of adjusting rectifier settings for optimizing rectifier performance. Using data for die temperature and operating frequency, software can create a feedback loop, dynamically adjusting rectifier settings in order to achieve the best possible efficiency and functionality at any given operating point. Die temperature can be used to measure efficiency in the background. In step 1301, operating frequency is measured. In step 1302, rectifier settings are adjusted for low frequency. In step 1303, rectifier settings are adjusted for high frequency. From step 1304 to 1305 and to 1306, data for die temperature samples is used to create a feedback loop to further adjust rectifier comparator settings.

Figure 14:
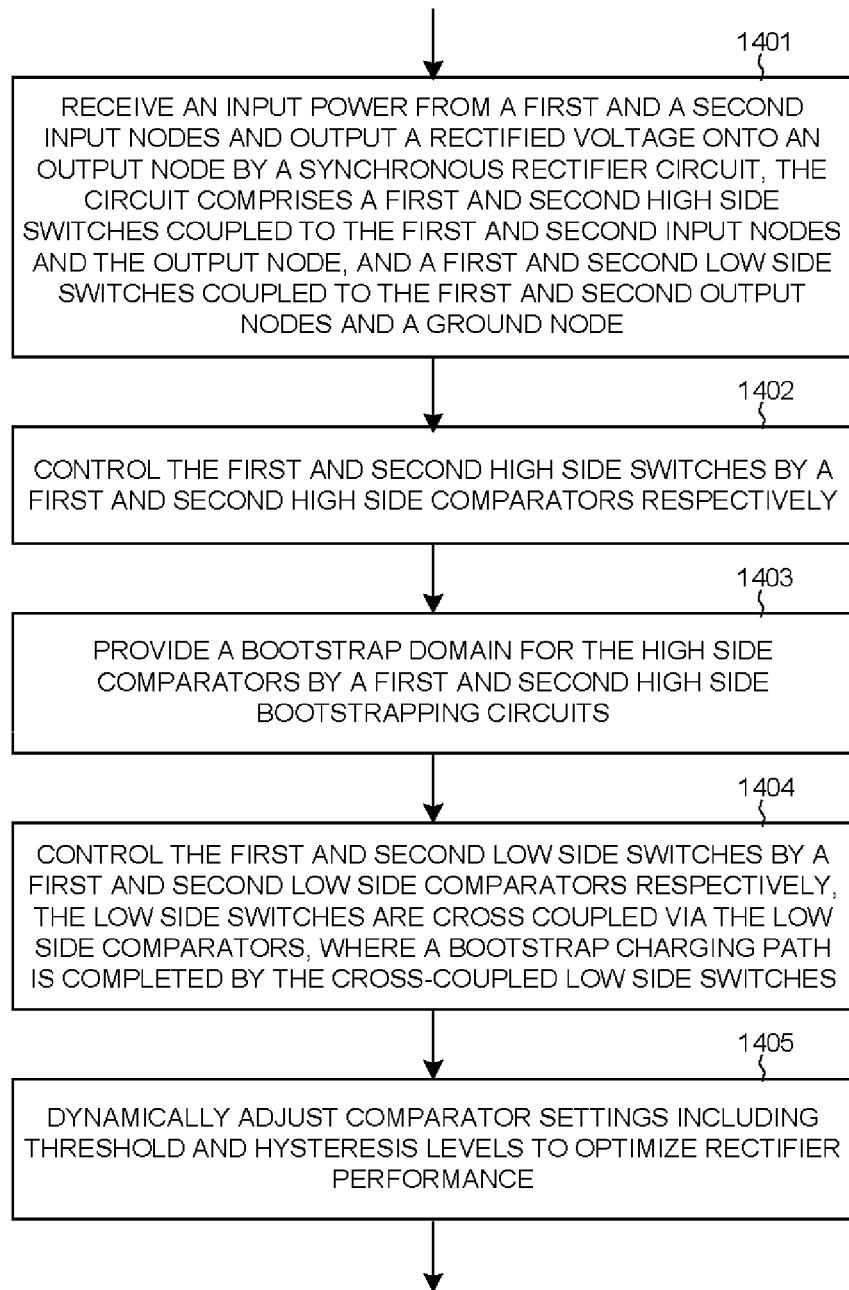
FIG. 14 is a flow chart of a method of providing a rectified output voltage using a synchronous rectifier in accordance with one novel aspect.

FIG. 14 is a flow chart of a method of providing a rectified output voltage using a synchronous rectifier in accordance with one novel aspect. In step 1401, asynchronous rectifier circuit receives an input power from a first and a second input node, and outputs a rectified voltage onto an output node. The circuit comprises a first and a second high side switch coupled to the first and the second input nodes and the output node, and a first and a second low side switch coupled to the first and the second input nodes and a ground node. In step 1402, the circuit controls the first and the second high side switches by a first and a second high side comparators respectively. In step 1403, the circuit provides a bootstrap domain for the high side comparators by a first and a second high side bootstrapping circuits. In step 1404, the circuit controls the first and the second low side switches by a first and a second low side comparator respectively. The low side switches are cross-coupled via the low side comparators. A bootstrap-domain charging path is completed through the cross-coupled low side switches. In step 1405, using a software feedback loop, the circuit dynamically adjusts comparator settings including threshold and hysteresis levels to optimize rectifier performance.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A synchronous rectifier circuit comprising:
   first and second high side switches coupled to first and second input nodes and an output node for outputting a rectified voltage;
   first and second low side switches coupled to the first and second input nodes and a ground node;
   first and second high side comparators that control the first and the second high side switches, respectively; and first and second low side comparators that control the first and second low side switches, respectively, wherein the first low side switch is coupled to a first AC input of the second low side comparator and the second low side switch is coupled to a second AC input to the first low side comparator.

2. The synchronous rectifier circuit of claim 1, wherein the first and the second high side switches and the first and the second low side switches are N-Channel metal-oxide-semiconductor field effect transistors (MOSFETs).

3. A synchronous rectifier circuit comprising:
first and second high side switches coupled to first and second input nodes and an output node for outputting a rectified voltage;
first and second low side switches coupled to the first and second input nodes and a ground node;
first and second high side comparators that control the first and the second high side switches, respectively;
first and second low side comparators that control the first and second low side switches, respectively, wherein the first low side switch is coupled to a first input of the second low side comparator and the second low side switch is coupled to a second input to the first low side comparator; and
first and second high side bootstrapping circuits that provide a bootstrap domain for the first and second high side comparators.

4. The synchronous rectifier circuit of claim 3, wherein a bootstrap-charging path for the first and second high side bootstrapping circuits is completed by the first and second low side switches.

5. The synchronous rectifier circuit of claim 4, wherein the first low side switch turns on during a first half cycle to charge the first high side bootstrapping circuit, and wherein the second low side switch turns on during a second half cycle to charge the second high side bootstrapping circuit.

6. The synchronous rectifier circuit of claim 4, wherein the first and second low side comparators turn on the first and second low side switches each cycle to complete the bootstrap-charging path independent from a loading of the synchronous rectifier circuit.

7. A synchronous rectifier circuit comprising:
first and second high side switches coupled to first and second input nodes and an output node for outputting a rectified voltage;
first and second low side switches coupled to the first and second input nodes and a ground node;
first and second high side comparators that control the first and the second high side switches, respectively; and
first and second low side comparators that control the first and second low side switches, respectively, wherein the first low side switch is coupled to a first input of the second low side comparator and the second low side switch is coupled to a second input to the first low side comparator,
wherein the first low side comparator controls the first low side switch by comparing a second input voltage on the second input node and a ground voltage plus an offset voltage, or wherein the second low side comparator controls the second low side switch by comparing a first input voltage on the first input node and a ground voltage plus an offset voltage.

8. The synchronous rectifier circuit of claim 1, wherein the first and second low side comparators have settings including threshold and hysteresis levels, and wherein the settings are dynamically adjustable.

9. The synchronous rectifier circuit of claim 8, wherein the settings are dynamically adjusted based on die temperature and operating frequency.

10. A method comprising:
receiving an input power from first and second input nodes and outputting a rectified voltage onto an output node by a synchronous rectifier circuit, wherein the synchronous rectifier circuit comprises first and second high side switches coupled to the first and second input nodes and the output node, and wherein the synchronous rectifier circuit further comprises first and second low side switches coupled to the first and second input nodes and the ground node;
controlling the first and the second high side switches by first and second high side comparators, respectively; and
controlling the first and the second low side switches by first and second low side comparators, respectively, wherein the first low side switch is coupled to a first AC input of the second low side comparator and the second low side switch is coupled to a second AC input to the first low side comparator.

11. The method of claim 10, wherein the first and the second high side switches and the first and the second low side switches are N-Channel metal-oxide-semiconductor field effect transistors (MOSFETs).

12. A method comprising:
receiving an input power from first and second input nodes and outputting a rectified voltage onto an output node by a synchronous rectifier circuit, wherein the synchronous rectifier circuit comprises first and second high side switches coupled to the first and second input nodes and the output node, and wherein the synchronous rectifier circuit further comprises first and second low side switches coupled to the first and second input nodes and the ground node;
controlling the first and the second high side switches by first and second high side comparators, respectively;
controlling the first and the second low side switches by first and second low side comparators, respectively, wherein the first low side switch is coupled to a first AC input of the second low side comparator and the second low side switch is coupled to a second AC input to the first low side comparator; and
providing a bootstrap domain for the first and second high side comparators by first and second high side bootstrapping circuits.

13. The method of claim 12, wherein a bootstrap-charging path for the first and second high side bootstrapping circuits is completed by the first and second low side switches.

14. The method of claim 13, wherein the first low side switch turns on during a first half cycle to charge the first high side bootstrapping circuit, and wherein the second low side switch turns on during a second half cycle to charge the second high side bootstrapping circuit.

15. The method of claim 13, wherein the first and second low side comparators turn on the first and second low side switches every cycle to complete the bootstrap-charging path independent from a loading of the synchronous rectifier circuit.

16. A method comprising:
receiving an input power from first and second input nodes and outputting a rectified voltage onto an output node by a synchronous rectifier circuit, wherein the synchronous rectifier circuit comprises first and second high side switches coupled to the first and second input nodes and the output node, and wherein the synchronous rectifier circuit further comprises first and second low side switches coupled to the first and second input nodes and the ground node;

controlling the first and the second high side switches by first and second high side comparators, respectively; and controlling the first and the second low side switches by first and second low side comparators, respectively, wherein the first low side switch is coupled to a first AC input of the second low side comparator and the second low side switch is coupled to a second AC input to the first low side comparator, wherein the first low side comparator controls the first low side switch by comparing a second input voltage on the second input node and a ground voltage plus an offset voltage or wherein the second low side comparator controls the second low side switch by comparing a first input voltage on the first input node and a ground voltage plus the offset voltage.

17. The method of claim 10, further comprising:
dynamically adjusting settings of the first and second low side comparators including threshold and hysteresis levels.

18. The method of claim 17, wherein the settings are dynamically adjusted based on die temperature and operating frequency.

* * * * *